(12) United States Patent
Palomares

(10) Patent No.: US 11,099,296 B2
(45) Date of Patent: Aug. 24, 2021

(54) OMNIDIRECTIONAL IDENTIFICATION SENSOR FOR A DEEPLY BURIED NON-METAL POLYMER TUBE

(71) Applicant: ELYDAN S.A.S., Saint-Étienne-de-Saint-Geoirs (FR)

(72) Inventor: Marc Palomares, Grenoble (FR)

(73) Assignee: ELYDAN S.A.S.

( * ) Notice: Subject to any disclaimer, the term of this patent is extended or adjusted under 35 U.S.C. 154(b) by 0 days.

(21) Appl. No.: 16/769,283

(22) PCT Filed: Dec. 4, 2018

(86) PCT No.: PCT/EP2018/083546
§ 371 (c)(1),
(2) Date: Jun. 3, 2020

(87) PCT Pub. No.: WO2019/110615
PCT Pub. Date: Jun. 13, 2019

(65) Prior Publication Data
US 2020/0371271 A1   Nov. 26, 2020

(30) Foreign Application Priority Data
Dec. 5, 2017 (FR) .................................... 1771307

(51) Int. Cl.
*G01V 15/00* (2006.01)
*G06K 7/10* (2006.01)
(Continued)

(52) U.S. Cl.
CPC ......... *G01V 15/00* (2013.01); *G06K 7/10366* (2013.01); *G06K 19/07773* (2013.01); *H01Q 1/2225* (2013.01)

(58) Field of Classification Search
CPC .............. G01V 15/00; G06K 7/10366; G06K 19/07773; H01Q 3/24
(Continued)

(56) References Cited

U.S. PATENT DOCUMENTS

2007/0057769 A1   3/2007   Corbett
2008/0204235 A1   8/2008   Cook
(Continued)

FOREIGN PATENT DOCUMENTS

| FR | 2887712 A1 | 12/2006 |
| FR | 2961353 A1 | 12/2011 |
| WO | 2011073657 A2 | 6/2011 |

OTHER PUBLICATIONS

International Search Report and Written Opinion in corresponding International Patent Application No. PCT/EP2018/083546 dated Apr. 24, 2019. 32 pages.

*Primary Examiner* — Toan C Ly
(74) *Attorney, Agent, or Firm* — Leason Ellis LLP

(57) ABSTRACT

The invention relates to an RFID-type transponder for a contactless identification and wireless communication system, intended to affixed to a buried polymer pipe, comprising: an RFID chip; an electronic switching circuit coupled to the RFID chip; a first antenna coupled to the switching circuit, said first antenna having a surface covering a first portion of the external surface of the polymer pipe; and a second antenna coupled to the switching circuit, said second antenna having a surface covering a second portion of the external surface of the polymer pipe, said second portion being different from the first portion. According to the invention, the switching circuit is configured to: couple the first antenna to the RFID chip when the voltage captured at die edge of the first antenna, and corresponding to the magnetic field, by an RFID emitter is greater than the voltage captured at the edge of the second antenna; and (Continued)

couple the second antenna to the RFID chip when the voltage captured at the edge of the second antenna by an RFID emitter is greater than the voltage captured at the edge of the first antenna.

13 Claims, 12 Drawing Sheets

(51) Int. Cl.
    *G06K 19/077*      (2006.01)
    *H01Q 1/22*      (2006.01)

(58) Field of Classification Search
    USPC ........................................................ 235/451
    See application file for complete search history.

(56) References Cited

U.S. PATENT DOCUMENTS

| | | | |
|---|---|---|---|
| 2009/0091959 A1* | 4/2009 | Takahashi | G03G 15/80 |
| | | | 363/126 |
| 2013/0263958 A1* | 10/2013 | Vinoy | G01V 15/00 |
| | | | 138/108 |
| 2014/0191904 A1 | 7/2014 | Illerhaus | |
| 2015/0123664 A1* | 5/2015 | Olsson | G01V 15/00 |
| | | | 324/326 |
| 2017/0310367 A1 | 10/2017 | Choi et al. | |
| 2019/0363584 A1* | 11/2019 | Leem | H02J 7/025 |

\* cited by examiner

OMNIDIRECTIONAL IDENTIFICATION SENSOR FOR A DEEPLY BURIED NON-METAL POLYMER TUBE

CROSS-REFERENCE TO RELATED PATENT APPLICATIONS

This application is a U.S. National Stage Application under 35 U.S.C. § 371 of International Patent Application No. PCT/EP2018/083546, filed Dec. 4, 2018, which claims the benefit of priority of French Patent Application number 1771307 filed Dec. 5, 2017, both of which are incorporated by reference in their entireties. The International Application was published on Jun. 13, 2019, as International Publication No. WO 2019/110615 A1.

TECHNICAL FIELD

The present invention relates to the field of RFID identification sensors for non-metallic tubes, used to make buried pipes, and in particular an omnidirectional RFID identification sensor suitable for great depths.

BACKGROUND ART

Polymers (Polyethylene PE, Polypropylene PP, PVC, PRV etc. . . . ) are materials widely used for the realization of underground pipes, particularly allowing the distribution of water, gas, electricity, telecommunications.

The advantage of detecting and/or identifying underground pipes is clear and first techniques have been developed to enable Radio Field Identification Detection, RFID, of an underground pipeline.

The international patent application WO2011157941 filed on Jun. 14, 2011 by the COMMISSARIAT A L'ENERGIE ATOMIQUE ET AUX ENERGIES ALTERNATIVES, relates to a wetland antenna which can be used to carry out an RFID sensor/transponder for a pipe buried polymer. That prior art discloses provides a first significant solution to the problem of tolerance vis-à-vis the external environment. That working of such known antenna is illustrated in FIG. 10: a set of turns (300$t$, 300$d$) is printed on a thin substrate. The upper turns (300$t$) are opposite the lower turns (300$d$). The arrangement produced results in a substantial distributed capacity (380), due to the short distance of the turns facing each other. It is this capacitance that serves as the tuning capacity for the antenna, while the antenna segments (300$t$, 300$d$) form the inductance. The implementation of Moebius loops and the distributed capacity (380) allow relative immunity to variations due to the external environment.

However, the implementation of this antenna is very sensitive to the manufacturing process. Indeed, the distributed capacity is a function of three direct parameters: the width of each segment (300$t$) and (300$d$), the thickness of the substrate between each segment (300$t$) and (300$d$), and the alignment of these segments with each other. Finally, a fourth, indirect parameter, appears to be the value of the permittivity of said substrate, which can vary depending on the humidity and the temperature. Additionally, with regard to the manufacturing cost, the process used requires the mandatory presence of a substrate, which must be printed with double-sided metal tracks.

For its part, RYB has filed a patent application WO 2012/062471 concerning a polymer tube equipped with an identification sensor or RFID tag.

In general, it should be recalled that the wireless communication and contactless identification technology, designated under the name RFID, relates more particularly to the HF field of technology (13.56 MFIz in our example) for which communication is mainly done by magnetic field. In this frequency range the reading distances are generally less than 1 meter. The system then consists of a transmitter (active principle, power generator) and a transponder (passive principle, remote powered)

As illustrated in FIGS. 1 and 2, respectively, a RFID transponder conventionally comprises the connection in series (FIG. 1), or in parallel (FIG. 2), of at least the 3 following elements: an antenna (100), a chip RFID (101), and a capacitor (102).

The antenna (100) consists of one or more turns enabling part of the electromagnetic emission power of an RFID transmitter located on the ground to be collected. In this regard, the antenna has a minimum area allowing the activation of the RFID chip. In practice, this surface corresponds to the capture of a minimum power in relation to the maximum emission power of the reader, the detection distance and the power requirements of the RFID chip. The number of turns will be related to the minimum activation voltage of the RFID chip.

The antenna has an inductance designated $L_{ant}$. This inductance value is a function of the geometry of the antenna. As an example, an approximation for a circular antenna composed of N contiguous or superimposed turns, of a radius R and of a diameter of conductor a is the following:

$L = \mu_0 * R * N^2 * (\ln(8*R/a) - 2)$ with $\mu_0 = 4\pi * 10^{-7}$ and Ln being the natural Logarithm operator.

The RFID chip can be considered as a capacitor noted $C_{tag}$. An example value is around 20 pF ($20*10^{-12}$F)

The assembly must resonate at a frequency which is close to the frequency of the signal, and as is known to a person skilled in the art, the equation which gives the resonant frequency is: $f_0 = 1/2\pi\sqrt{L_{ant}*C_{acc}}$ with $C_{acc} = C_{102} + C_{tag}$ for FIG. 1 (parallele case) or $C_{acc} = C_{102} * C_{tag}/C_{102} + C_{tag}$ for FIG. 2 (serial case). $C_{acc}$ represents the capacity of the resonant system.

If $L_{ant}$ is fixed by the geometry of the antenna, $f_0$ is imposed by the system, there only remains as an adjustment variable $C_{acc}$. This value is given to us by the well known relationship:

$$C_{acc} = 1/4\pi^2 * f_0^2 * L_{ant}$$

Other techniques can be used, as in FIGS. 3 and 4, where we now see that the RFID chip 101 is isolated from the resonant circuit by means of a coupler 103.

Furthermore, it should be noted that, to mitigate the effects of frequency drifts (drifts of component values linked to temperature or to dispersion due to tolerance, or to the environments in which the transponders are located), conventional techniques impose a relatively low quality factor (generally around 30 to 40). However, the more the antenna surface and/or the number of turns increases, the more $L_{ant}$ increases, the quality factor being proportional to $L_{ant}$. The latter therefore increases, until becoming problematic for an industrialist who envisages the mass production of RFID tags for buried polymer pipes. In fact, when $L_{ant}$ increase (be it an increase in surface area or an increase in the number of turns) one notices that $C_{acc}$ must decrease in order to be able to keep the circuit resonating at value $f_0$. If for a given realization we obtain $L_{ant} = 11$ H ($11*10^{-6}$H), with for example $f_0 = 13.56$ MHz ($13.56*10^6$ Hz), then $C_{acc} = 12.52$ pF.

It can then be seen that it is practically impossible to carry out a circuit with the components in parallel, as illustrated in FIG. 1. There therefore remains only the serialization illustrated in FIG. 2, which requires, with formulas well known to a person skilled in the art, $C_{102}=33.5$ pF, but in doing so, and always by well-known formulas, we impose a voltage divider bridge formed by $C_{tag}$, $C_{102}$. Which in our example introduces a voltage drop at the terminal of $Y_{101}$ of the order of a third, then reducing the detection capacity of the transponder.

The use of the coupling process illustrated in FIGS. 3 and 4 could improve the situation but is relatively expensive in the perspective of a mass industrialization, either from the component point of view (1 additional coupler component) or from the manufacturing point of view for positioning a pre-chip equipped with a coupling element. In addition, the overall efficiency of the transponder is reduced by the presence of the coupler, due to the intrinsic efficiency of the latter.

Furthermore, it has been found that none of the known solutions, and in particular the aforementioned solution described in the above-mentioned patent application WO 201 1 157941, does not guarantee a good tolerance on the tuning frequency. It can be seen that this frequency $f_0$ will depend on 3 separate direct parameters: the process for producing the turns (100, 200x) (influence on the value of the inductance), the tolerance on the tuning capacities (102, 202x), and finally the tolerances on the parasitic capacities (280x, capacity of (201)). A 4th factor, which is indirect, is the operating temperature, which will introduce a drift of the different values (essentially the capacities) compared to a nominal temperature (typically 25° C.)

For variations due to temperatures, measurements have been taken, and are illustrated in FIG. 8b, and it is observed that the frequency offset is of the order of 140 kHz over the range 0-40° C.

If the tolerances on the component values are taken into account, for example a variation of 2% on the nominal value of the tuning capacity results in a variation of 130 kHz on the resonance frequency.

Thus, without taking into account other influences (due to the environment in particular) we have a minimum of 270 kHz of possible variation on the resonance frequency.

This particular problem was significantly addressed by the international patent application PCT/EP2017/074142 dated Sep. 22, 2017 filed by the applicant of the present application, claiming priority from the French patent application FR16/10392 dated Sep. 23, 2016, using an 'RFID tag based on a specific antenna layout comprising:

a set of antenna segments made up of electrical conductors constituting at least a first and a second antenna element (203-1, 203-2), a printed circuit comprising an RFID chip and at least one tuning capacity (202x) as well as a connector (281) allowing the electrical connection of said antenna segments. The antenna segments are arranged close to each other, at a distance of less than 3 mm and preferably less than 1 mm, so as to allow the appearance of coupling capacitances capable of widening the tolerance band on the frequency. RFID resonance.

In this way, an RFID tag is carried out which can allow the identification of a polymer tube buried at great depth.

On the other hand, numerous measurements and experiments have shown that if this RFID tag thus designed makes it possible to detect and identify tubes to a great depth, the effectiveness of this becomes dependent on the position that the latter takes relative to the buried tube.

In a favorable arrangement, the label would be positioned on top of the buried tube, so as to present its antenna in a horizontal plane, and therefore perpendicular to the axis separating it from a surface detector.

In a less favorable arrangement, if the tube is not ideally positioned in its trench—which can happen when the tube is towed inside a trench or a conduit—the label may not appear ideally with an optimal antenna orientation to receive the maximum magnetic flux from the surface detector.

In this situation, the RFID tag may simply not be visible to the surface detector.

The invention aims to solve this crucial problem.

SUMMARY OF THE INVENTION

The object of the present invention is to achieve a device for detecting an RFID chip buried at great depth—up to three meters—allowing omnidirectional detection and identification of a non-metallic polymer pipe.

Another object of the present invention is to achieve a device for detecting an RFID chip, or transponder, allowing great tolerance relative to the rotation of the tube relative to its generator axis within the trench or the conduit buried underground.

It is a third object of the present invention to provide a transponder at low manufacturing cost and providing better energy efficiency compared to existing embodiments.

It is another object of the present invention to allow the production of an RFID tag which can be used as a marker integrated into a tube or a pipe laid by towing, that is to say without trench.

The invention achieves these aims by means of a transponder for a wireless communication and contactless identification system, of the RFID type, intended to be affixed to a buried polymer pipe, said transponder comprising:
  an RFID chip;
  an electronic switching circuit coupled to said RFID chip;
  a first antenna coupled to said switching circuit, said first antenna having a surface covering a first part of the external surface of said polymer pipe;
  a second antenna coupled to said switching circuit, said second antenna having a surface covering a second part of the external surface of said polymer pipe, said second part being distinct from said first part;
  The switching circuit is configured for:
    coupling said first antenna to said RFID chip when the voltage sensed at the edge of said first antenna and corresponding to the magnetic field by an RFID transmitter is greater than the voltage sensed at the edge of the second antenna;
    coupling said second antenna to said RFID chip when the voltage sensed at the edge of said second antenna by an RFID transmitter is greater than the voltage sensed at the edge of the first antenna.

In a preferred embodiment, the transponder comprises a set of three antennas coupled to the switching circuit, the coverage area of each of said first, second and third antennas corresponding to an angle of 120 degrees. The switching circuit is then configured to couple the RFID chip to that among the first, second and third antenna which has the highest voltage, in which said switching circuit decouples the other two antennas having the lowest voltages.

Alternatively, the invention allows the realization of a transponder for a wireless communication and contactless identification system, of the RFID type, intended to be affixed to a buried polymer pipe, which comprises at least:

a first RFID chip associated with a first antenna, said first antenna having a surface covering a first part of the exterior surface of said polymer pipe;

a second RFID chip associated with a second antenna, said second antenna having a surface covering a second part of the external surface of said polymer pipe, said second part being distinct from said first part.

The first and second RFID chips are configured to include a field for storing an identification element, UID, of said second chip and first RFID chip, respectively. The identification elements are used during a communication session between a transponder and an external reader (located on the surface) to determine that the two RFID chips belong to the same buried pipe.

Preferably, the transponder comprises a set of three RFID tags forming a macro-label, covering a surface of the external envelope of the pipe corresponding to an angle of 120 degrees, in such a manner that the set of three RFID tags appears as a sleeve wherein the pipe is being inserted. Each of the three RFID chips associated within the same macro-tag carries in its internal memory the identification elements, UID, of the other two RFID chips, so that a surface reader can associate the three RFID chips with the same pipeline.

Preferably, each of the antennas associated with the same RFID chip comprises:

a set of antenna segments made up of electrical conductors constituting at least a first and a second antenna element, a printed circuit comprising an RFID chip and at least one tuning capacity as well as a connector allowing the electrical coupling of said antenna segments. The antenna segments are arranged close to each other, at a distance of less than 3 mm and preferably less than 1 mm, so as to allow the appearance of coupling capacitances capable of widening the tolerance band on the frequency RFID resonance.

Preferably, the RFID chips include means of communication of the identity, the characteristics of manufacture of the tube, and the location of the tube.

More specifically, the transponder is intended for the identification of a fluid distribution pipe (e.g. drinking water) or gas, protection of electric cable or fiber optic cable.

DESCRIPTION OF THE DRAWINGS

Other characteristics, object and advantages of the invention will appear on reading the description and the drawings below, given only by way of non limiting examples. In the accompanying drawings.

DESCRIPTION OF THE PREFERRED EMBODIMENTS

We will now consider a particular embodiment of an RFID transponder intended for producing an omnidirectional RFID tag for a pipe or pipe intended to be buried underground, which becomes significantly insensitive to the orientation of the pipe in the trench. We typically consider the example of a HDPE (High Density Polyethylene) tube, suitable for the construction of a pipeline for the supply of drinking water, gas distribution, sanitation, protection of electric cable and optical fiber. Consider in particular the example of a polyethylene multilayer tube for buried pressure pipes, consisting of a high density polyethylene tube PE 80 or PE 100 meeting the standard EN1555. More specifically, the RFID tag will be used to transmit information relating to the identity, manufacturing characteristics of the tube, and the location of the tube.

The presentation successively describes:

description of an elementary antenna for RFID tag a first embodiment: Omnidirectional RFID tag with disconnectable antennas a second embodiment—RFID macro-label 1. Description of an Elementary Antenna for RFID Tag The presentation will take up a significant part of the teaching of application PCT/EP2017/074142.

Figure 1:
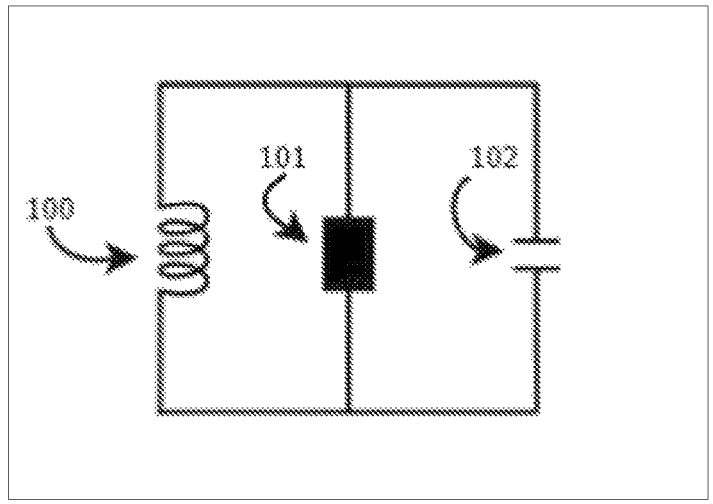
FIG. 1 illustrates the classic structure of an RFID transponder based on the parallel connection of an antenna, an RFID chip and a capacitor.
Figure 2:
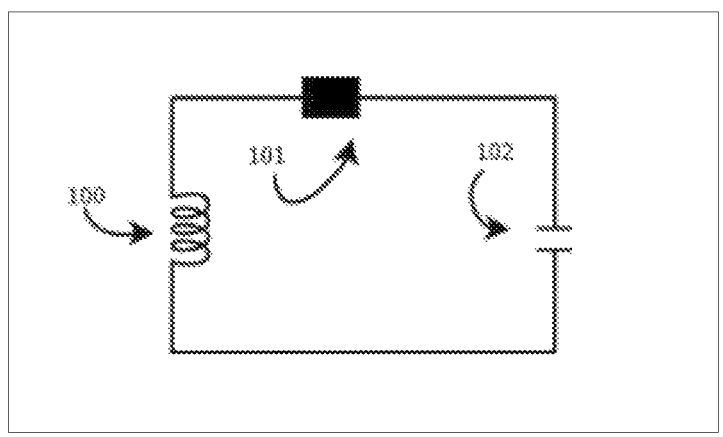
FIG. 2 illustrates the conventional structure of an RFID transponder based on the serial connection of an antenna, an RFID chip and a capacitor.
Figure 3:
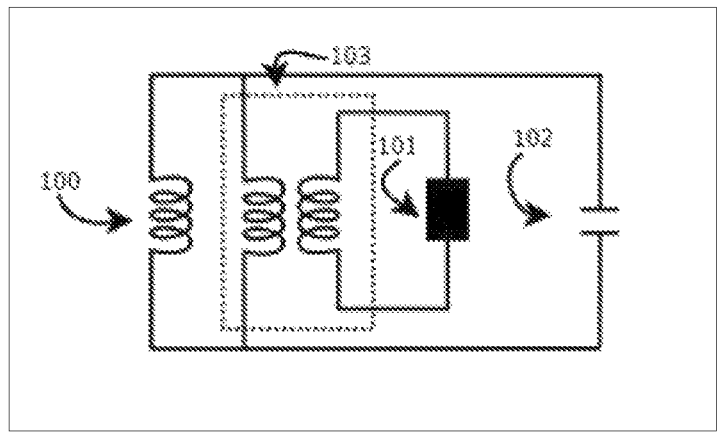
FIGS. 3 and 4 illustrate two variants of a known architecture of an RFID transponder comprising a coupler 103 allowing the connection of the RFID chip to the oscillating element.
Figure 4:
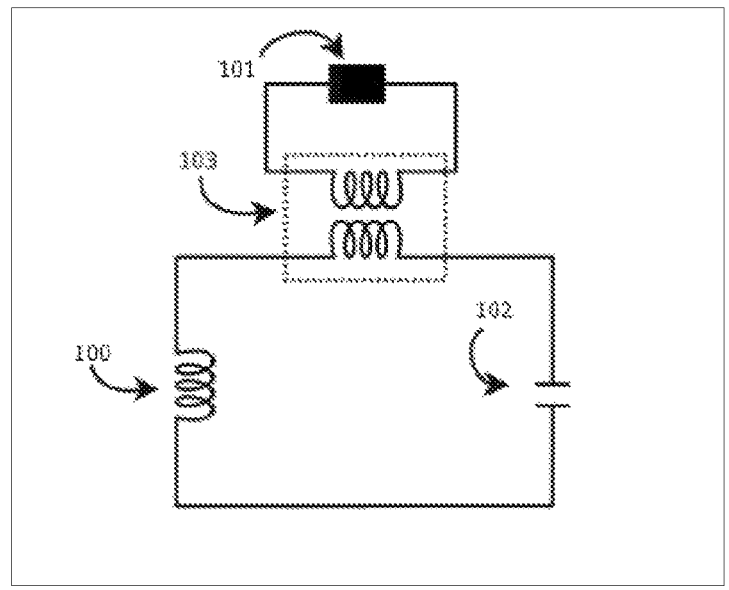
Figure 5:
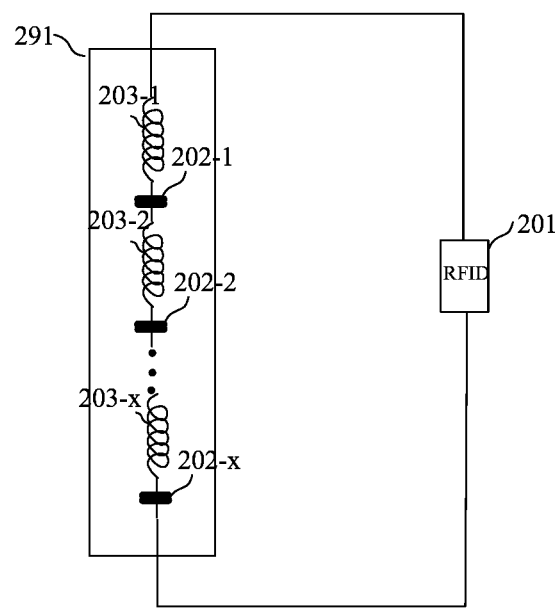
FIG. 5 illustrates the electrical diagram of an embodiment of an RFID transponder comprising an RFID chip and a plurality of antenna elements.

Referring to FIG. 5, the RFID transponder consists of a resonant system, comprising an antenna 291, consisting of a series of antenna elements 203-1, 203-2, . . . 203-*x*, capacitors 202-1, 202-2 . . . 202-*x*, connected in series with a conventional RFID 201 chip. The RFID chip is an integrated circuit suitable for the implementation of wireless communication and contactless identification techniques known as RFID. Such an RFID chip is well known to a person skilled in the art and, for the sake of brevity, will not be described further.

In the embodiment illustrated in FIG. 5, each end of an antenna element is connected either to a capacitor 202-1, 202-2, . . . 202-x, or to an electrode of the RFID chip 201.

In general, each antenna element consists of one or more individual physical conductive elements—or antenna segments designated by the generic reference 200x (not shown in FIG. 5), each of which consists of at least a significant fraction of a turn constituting the sensing element. A first antenna segment could, for example, consist of a half-turn. A second antenna segment may consist of an entire turn. A third antenna segment may consist of one and a half turns. A fourth of two turns etc. . . .

Thus, the antenna elements 203-1, . . . 203-x can take various and varied configurations, based on multiple combinations of antenna segments 200x.

In general, each antenna segment 200x consists of an electrical conductor, isolated or not, arranged within a multi-strand or single-strand cable, without restriction of section. Each antenna segment 200x can differ from another in the same embodiment, both in geometry and in the number of turns, thus allowing great possibilities of variation in the design of the RFID tag.

With regard to the capacitors 202-1, 202-2, . . . 202-x shown in FIG. 5, it should be noted that these can take very diverse forms. In particular, a capacitor 202-x is not necessarily restricted to a single element, but can be conceived as a placing in series and/or parallel of several individual capacitors, forming according to the rules of the art the equivalent of a single capacitor. In the same way, it will be noted that the capacitors 202-1, 202-2, . . . , 202-x may be of different value.

Figure 6A:
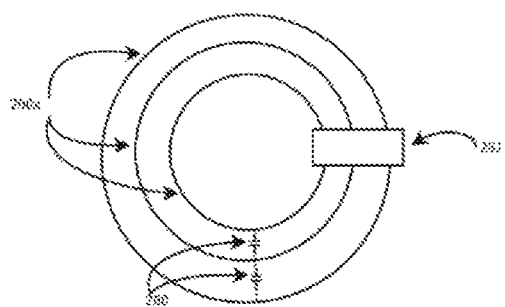
FIG. 6*a* presents an embodiment of a first topology of antenna segments organized concentrically.
Figure 6B:
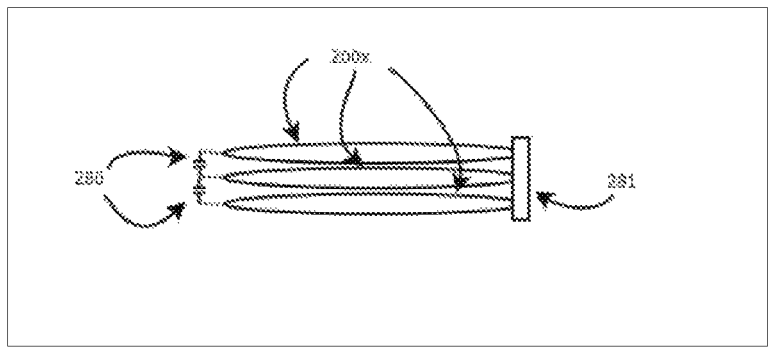
FIG. 6*b* presents an embodiment of a second topology consisting of a superposition in the axis perpendicular to the surface of the different antenna segments.
Figure 6C:
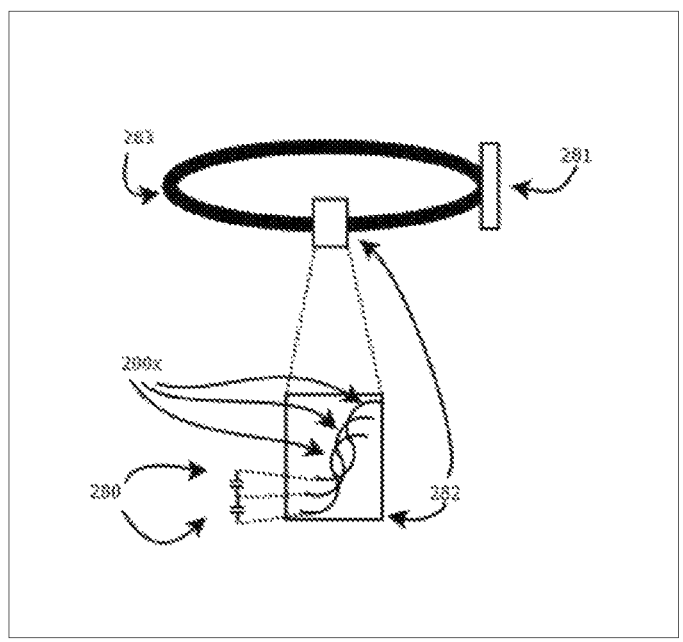
FIG. 6*c* presents an embodiment of a third topology consisting in twisting the different antenna segments together to form a twist

The antenna segments 200x composing the antenna elements 203-1, . . . , 203-x, can be arranged on a support according to different embodiments, as illustrated in FIGS. 6a, 6b and 6c.

More specifically, FIG. 6a illustrates a first topology of arrangement of the antenna segments 200x based on a concentric arrangement of three antenna segments 200x electrically connected to a printed circuit 281. In this configuration, the three antenna segments have a circular shape, disposed within the same plane, and are arranged very closely. Two immediately neighboring antenna segments are located at a distance of less than 3 mm and preferably 1 mm to allow the appearance of coupling capacity 280 illustrated in FIG. 6a.

A second topology is illustrated in FIG. 6b where we see the superposition in the axis perpendicular to the surface of the different antenna segments, for example three antenna segments. As before, the three antenna segments, electrically connected to the printed circuit or connector 281, are arranged very closely, at a distance of less than 1 mm preferably, to allow the appearance of the coupling capacities also shown, in the FIG. 6b, by reference 280.

Finally, FIG. 6c illustrates a third topology in which the different antenna segments 200x constituting the antenna elements 203-1 . . . 203-x are twisted together to form a twist 282 which may possibly be overmolded to form a single sheath 283 connected to a printed circuit or connector 281. In this configuration, it is the fact of twisting the different antenna segments constituting the antenna elements which makes it possible to reveal coupling capacities whose interest will appear, with force, in the description which will follow below. after.

The topologies illustrated in FIGS. 6a, 6b and 6c are only illustrative examples of the multiple possibilities of topologies that can be envisaged for carrying out an embodiment of a RFID tag in accordance with the present invention. In general, a person skilled in the art to design a combination of the different topologies illustrated, such as for example two distinct groups of antenna segments of 3 turns, each produced according to the topology of FIG. 6c, and the two groups being by the assembly assembled according to the topology of FIG. 6b.

Clearly, there are no limits in the possibilities of combining the different topologies illustrated.

Figure 7A:
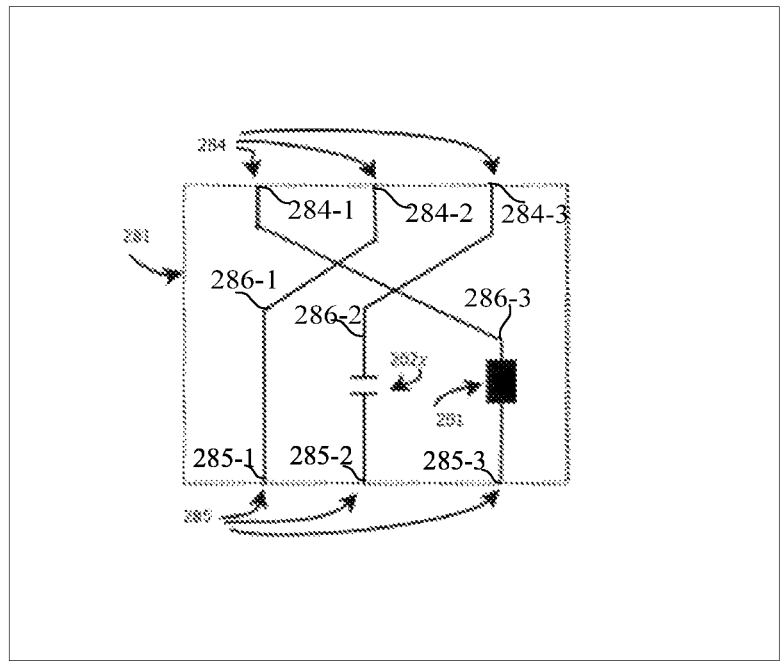
FIG. 7*a* illustrates a first embodiment of a printed circuit comprising two antenna elements consisting of three antenna segments.
Figure 7B:
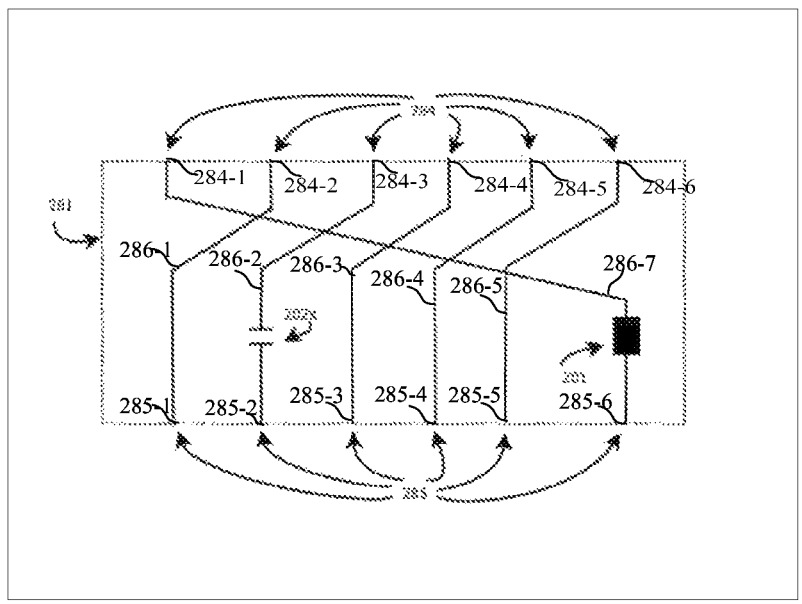
FIG. 7*b* illustrates a second embodiment of a printed circuit also comprising two antenna elements consisting of six antenna segments.
Figure 7C:
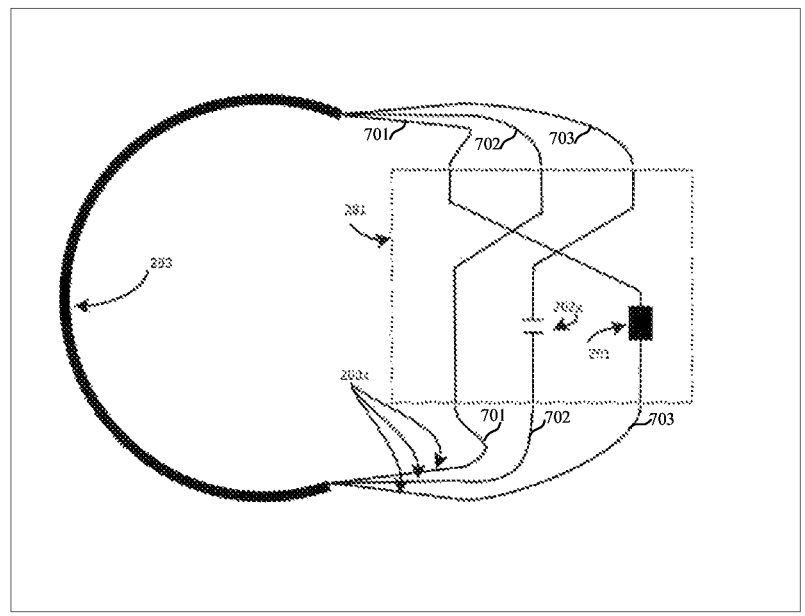
FIG. 7*c* illustrates the connection of the first embodiment of the connector of FIG. 7*a* in which the three antenna segments are realized by means of a single three-conductor cable.

We will now describe, with reference to FIGS. 7a, 7b, 7c and 7c, more particularly the connector 281 allowing the electrical connection of the antenna segments to the oscillating element of the RFID transponder.

In general, the connector 281 is made to allow the electrical coupling of the different antenna segments, to each other but also to the capacitors (s) 202-1, 202-2, . . . 202x, and to the RFID chip 201, in order to realize the oscillating element, as shown in the electrical diagram of FIG. 5.

In its simplest form, the connector can be based on a integrated circuit on which is disposed, the RFID chip 201, and the different capacitor(s) 202-1, 202-2, . . . 202x.

For the sake of simplicity, there has been shown, in the embodiments of FIGS. 7a-7d, a single capacitor 202x associated with an RFID chip, so that FIGS. 7a-7d represent, according to the diagram of FIG. 5, a set of two antenna elements (two breaks in the serial connection, one for the RFID chip and one for the 202x capacitor).

The different antenna segments are electrically connected via electrodes 284 and 285, which may be any number.

For example, the connector 281 of FIG. 7a takes the form of a printed circuit comprising a set of three input electrodes, respectively 284-1, 284-2, 284-3 and three output electrodes 285-1, 285-2 and 285-3 for the respective connection of three antenna segments 701, 702, 703 constituting the antenna 291.

The printed circuit/connector includes:

a first input electrode 284-1, a second input electrode 284-2 and a third input electrode 284-3 which allow the connection of a first end of the first segment 701, a first end of the second segment 702 and a first end of the third antenna segment 703, respectively;

a fourth output electrode 285-1, a fifth output electrode 285-2 and a sixth output electrode 285-3 which allow the connection of a second end of the first antenna segment 701, of a second end of the second antenna segment 702 and of a second end of the third antenna segment 703.

The printed circuit also includes:

a first circuit 286-3 allowing the connection of the first input electrode 284-1 to the third output electrode 285-3 via an RFID chip;

a second circuit 286-1 allowing the connection of the second input electrode 284-2 to the first output electrode 285-1;

a third circuit 286-2 allowing the connection of the third input electrode 284-3 to the second output electrode 285-2 via the capacitor 202x.

In a preferred embodiment which is illustrated in the diagram of FIG. 7c, the first, second and third antenna segments 701, 702, 703 are integrated within the same electric cable—formed of three wires—making it possible to generate a capacity distributed between said antenna segments.

Referring to FIG. 7c, we now describe a second embodiment of a printed circuit comprising a connector 281 allowing the connection of six antenna segments 801, 802, 803, 804, 805 and 806.

More specifically, the printed circuit includes a first input electrode 284-1, a second input electrode 284-2, a third input electrode 284-3, a fourth input electrode 284-4, a fifth electrode input 284-5 and a sixth input electrode 284-6 allowing the connection of a first end of a first antenna segment 801, of a first end of a second antenna segment 802, of a first end of a third segment d antenna 803, of a first end of a fourth antenna segment 804, of a first end a fifth antenna segment 805 and of a first end of a sixth antenna segment 806, respectively.

The printed circuit further comprises a seventh output electrode 285-1), an eighth output electrode 285-2, a ninth output electrode 285-3, a tenth output electrode 285-4, an eleventh output electrode 285-5 and a twelfth output electrode 285-6 allowing the connection of a second end of the first antenna segment 801, of a second end of the second antenna segment 802, of the second end of the third antenna segment 803, of the second end of the fourth antenna segment 804, of the second end of the fifth antenna segment 805 and the sixth antenna segment 806, respectively.

The printed circuit of FIG. 7c comprises:
- a first circuit 286-7 allowing the connection of the first input electrode 284-1 to the sixth output electrode 285-6 via an RFID chip;
- a second circuit 286-1 allowing the connection of the second input electrode 284-2 to the first output electrode 285-1;
- a third circuit 286-2 allowing the connection of the third input electrode 284-3 to the second output electrode 285-2 via the capacity 202x;
- a fourth circuit 286-3 allowing the connection of the fourth input electrode 284-4 to the third output electrode 285-3 via an RFID chip;
- a fifth circuit 286-4 allowing the connection of the fifth input electrode 284-5 to the fourth output electrode 285-4;
- a sixth circuit 286-5 allowing the connection of the sixth input electrode 284-6 to the fifth output electrode 285-5.

Figure 7D:
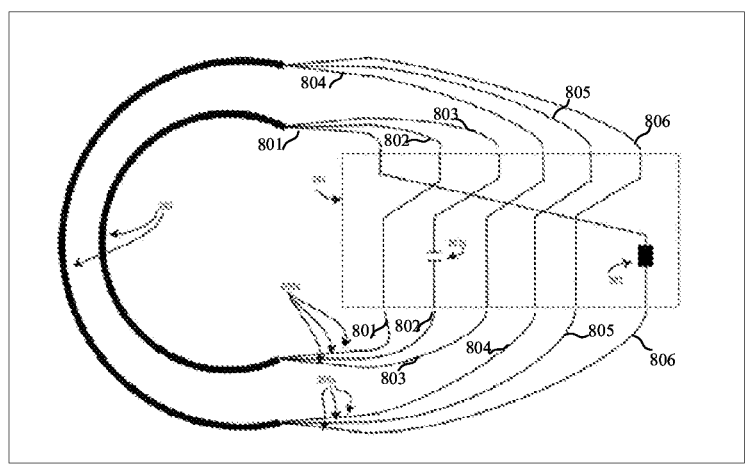
FIG. 7*d* illustrates the connection of the second embodiment of the connector of FIG. 7*b* in which the six antenna segments are produced by means of tri-conductor cables.

Preferably, the first, second and third antenna segments 801, 802 and 803 are integrated within a first three-wires electric cable and the fourth, fifth and sixth antenna segments 804, 805 and 806 are integrated into the within a second three-wire cable, as illustrated in the embodiment of FIG. 7d.

The arrangement of the antenna segments (200x) implemented in one of the embodiments (FIGS. 6a, 6b and 6c), or a combination of these, means that there is a capacitive coupling (280) between each conductor (antenna segment) (200x), more or less important depending on the embodiments. The distributed capacities (280) are created either naturally by the proximity of electrical conductors, or by the effective implementation of capacities. In addition, the presence of an external envelope (overmolding) (283) can further increase the value of this distributed capacity. It is this capacitive coupling which ensures fairly strong immunity to dispersion constraints, as well as to dispersive influences from external environments.

The structure of the antennas is determined so that the conductors are spaced 1 to 3 mm apart. In one of our embodiments, the conductors are molded 3 by 3 strands with a component having an $\varepsilon_r \cong 5$. This gives us a linear capacity (280) between each of the 3 strands taken 2 to 2 with a value between 50 and 75 pF/m.

Operation and Adaptation of the Frequency Resonance, Resistance to Tolerances and Variations The plurality of antenna segments (200x) forms the sensing surface, this surface must be sufficient to meet the need for the power supply of the RFID chip (201). The total number of turns from the plurality of antenna segments is such that the voltage across the RFID chips (201) is sufficient to activate it.

The frequency tuning is the first result of the serialization of a part of the inductance of the global antenna (plurality of (200x)) and others by the plurality of capacities (202x) connected in series.

However, the distributed capacities (280), although having a small impact on the resonance frequency, nevertheless plays a role in the calculation of the tuning capacity.

Figure 8A:
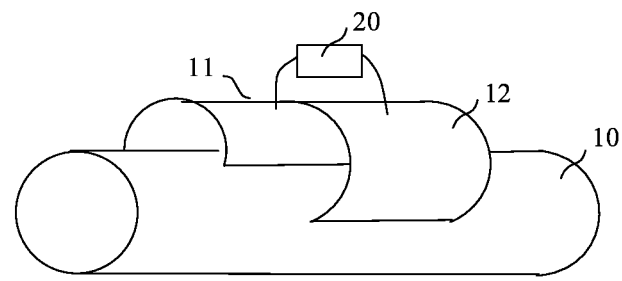
FIGS. 8*a*, 8*b* and 8*c* illustrate a first embodiment aimed at combining a single RFID chip with at least two antennas coupled to an electronic switch.

But the real role of these distributed capacities (280) is, on the one hand, to attenuate the influence of the parasitic capacities introduced by the external environment, and on the other hand, to allow a widening of the tolerance on the frequency agree as shown in FIG. 8a.

On some examples of embodiments, we will look at what variation in the tuning frequency guarantees us a decrease of less than 10 cm in the maximum reading distance. Two tests relate to embodiments carried out according to the teaching of the aforementioned patent application WO2011157941 (M1), while two other embodiments (M2, M3) relate to the invention.

On a test realization (M1), the turns were spaced 10 mm from each other, so that the distributed capacity is reduced to the maximum, and we get:
$f_{era4,min}$=13.525 MHz and $f_{M1,max}$=13.745 MHz, thus $\Delta_{M1}$=220 kHz On the embodiment of FIG. 7c described above, in which the turns (3 in number) are closely twisted together, we obtain:
$f_{eis2,min}$=13.495 MHz and $f_{M2,max}$=13.825 MHz, thus $\Delta_{M2}$=330 kHz This represents a 50% improvement in the tolerance band.

On existing realizations, corresponding to the teaching of the aforementioned patent application WO2011157941 (M1), an estimate has been made of the width of the tolerance band (FIG. 8c), and the estimation:
$f_{hum,min}$=13.535 MHz and $f_{hum,max}$=13.810 MHz, thus $\Delta_{hum}$=275 kHz In the embodiment (M3) of FIG. 7d, in which the turns are tightly twisted together, forming a total of two groups of 3 turns, the tolerance range could be determined, as illustrated in FIG. 8d:
$f_{eis2,min}$=13.540 MHz and $f_{M3,max}$=13.930 MHz, thus $\Delta_{M3}$=390 kHz This represents an increase of more than 40% in the tolerance band.

In addition, in this embodiment (M3), the antenna surface is 63 cm2, compared to the 132 cm2 of the solution permitted by the patent application WO2011157941 cited above, for a detection distance greater than 30 cm (180 cm instead of 150 cm). In an embodiment described above, a reading distance of 144 cm was obtained for an area of 19.6 cm$^2$. From an interpolation curve (calculated from various embodiments), it could be estimated that an area of 23.25 cm$^2$ was necessary to reach 150 cm, or 6 times less area than the recommended solution by the aforementioned patent application WO2011157941.

As we can see, the invention therefore makes it possible to significantly increase the tolerance range of the tuning frequency, and in addition, to gain energy efficiency, since we need less capture area compared to tags. existing for the same detection distance.

2) First Embodiment: Omnidirectional RFID Tab with Disconnectable Antennas

This first embodiment will be described in relation to FIGS. 8a to 8f, in which a single RFID chip is associated with at least a first and a second antenna, respectively 11 and 12, as described above, and fixed on the outer envelope of a tube or pipe 10.

Figure 8B:
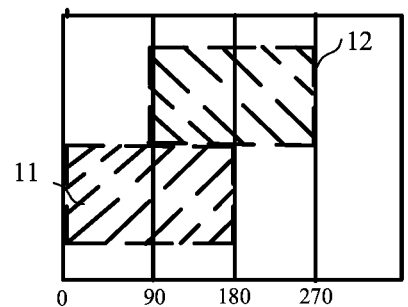
Figure 8C:
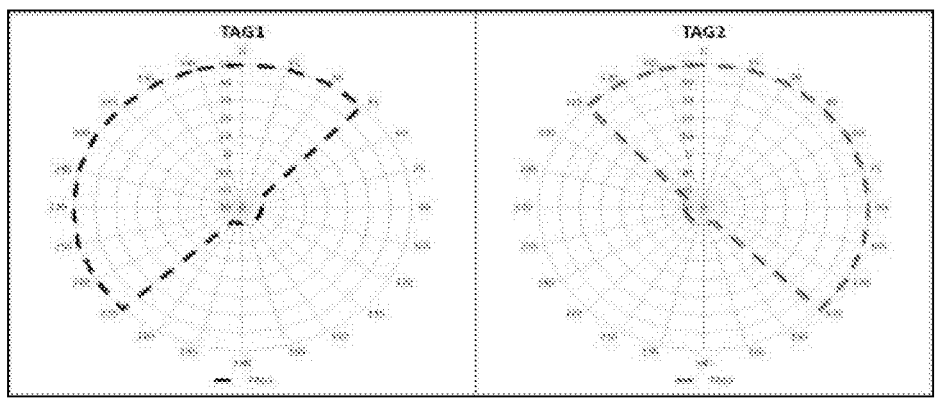
Figure 8D:
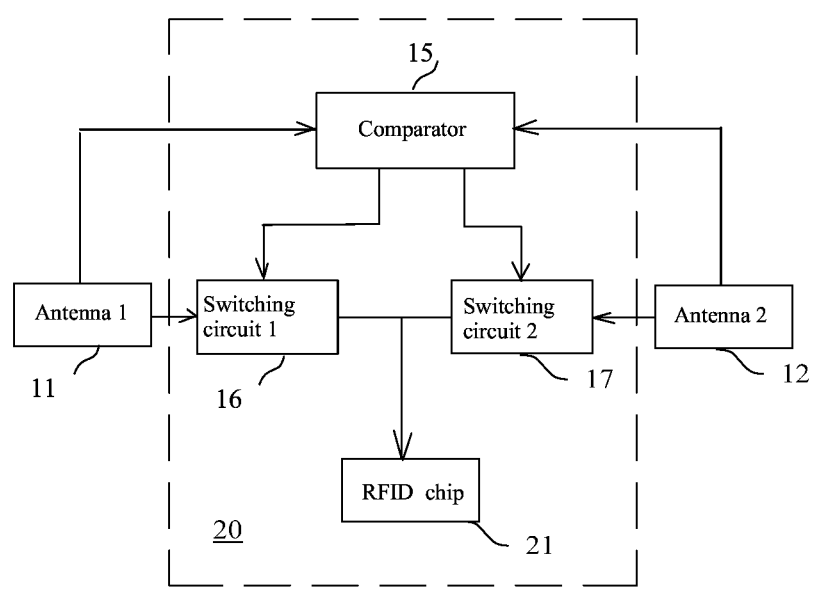
FIGS. 8*d* and 8*e* illustrate more particularly the detail of the electronic switching circuit.

More specifically, FIG. 8a is a perspective view showing the polymer tube 10 on which we just "affix" or wind the two flexible surfaces of the antennas 11 and 12, of substantially rectangular shape as shown in the exploded view of the FIG. 8b, but offset so as to cover or expose a differentiated solid angle for each of the antennas. FIG. 8c illustrates by two graphs, the covers or separate exposures of the two antennas (TAG1, TAG2).

Each of the two antennas 1 1 and 12 is coupled to an electronic circuit 20 comprising within it, or itself coupled to a single RFID chip 21.

In practice, several configurations are possible for placing two RFID antennas one next to the other, juxtaposed or not, according to various criteria and required performance. Once attached to the pipe, we can cover these polypropylene antennas to ensure protection.

FIG. 8d illustrates a block diagram of an electronic circuit 20 to which each of the two antennas 1 1 and 12 is coupled. The circuit 20 includes a voltage comparator 15 having two inputs and two outputs. Each of the inputs of the comparator 15 is connected to one of the two antennas 11 and 12 in order to detect the sensed voltage there. The first output of comparator 15 is connected to a first input of a first switch 16, a second input of which also receives the potential picked up by the antenna 11. The second output of comparator 15 is connected to a first input of a second switch 17, a second input of which receives the potential picked up by the antenna 12.

The outputs of switches 16 and 17 are coupled to the RFID chip 21 so that, as a function of the voltage sensed by each of the antennas 11 and 12, the comparator 15 controls the two switches 16 and 17 to:
  ensure the coupling of the first antenna 11 to the RFID chip 21 when it is the voltage sensed by this first antenna 11 which is greater than that of the second antenna 12; and
  conversely, ensure the coupling of the second antenna 12 to the RFID chip 21 when the voltage sensed by the second antenna 12 is greater than that of the first antenna 11.

Figure 8E:
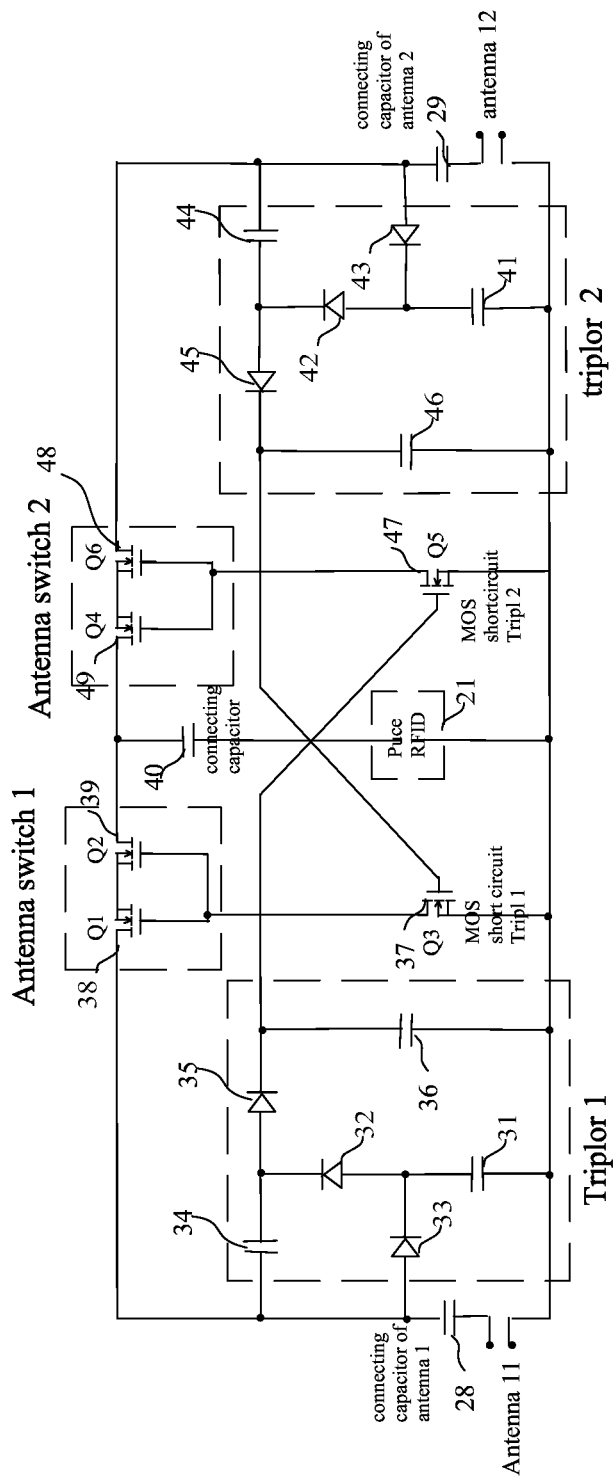

FIG. 8e illustrates a typical diagram of implementation of a block diagram of an electronic circuit intended to ensure switching between the antennas 11 and 12. In this regard, the two antennas 11 and 12 are coupled to the electronic circuit via two connection capacities, respectively 28 and 29. The circuit further comprises two voltage tripling circuits, making it possible to obtain a sufficient voltage to activate, if necessary two MOS circuits respectively 37 and 47, making it possible to come to control two pairs of MOS transistors Q1-Q2 and Q4-Q6, respectively 38-39 and 49-48, connected in series and allowing the coupling or decoupling of the output voltage of the antennas 11 and 12 to the RFID chip towards a connection capacity 40.

More specifically, the first tripler comprises:
  a first branch connected between the antenna 11 (via the capacitor 28) and the gate of the transistor 47 (Q5) consisting, in series, of a capacitor 34 and a diode 35 whose cathode is connected to the gate of transistor 47;
  a second branch connected between the ground and the midpoint of the first branch, consisting of a capacitor 31 connected to the anode of a diode 32 whose cathode is connected to the anode of diode 35;
  a diode 33, the anode of which is connected to the midpoint between the capacitor 28 and the capacitor 34, and the cathode of which is connected to the midpoint of the second branch, namely the anode of the diode 32; E a capacitor 36 connected between the cathode of the diode 35 and the ground.

Similarly, the second tripler includes:
  a first branch connected between the antenna 12 (via the capacitor 27) and the gate of the transistor 37 (Q3) consisting, in series, of a capacitor 44 and a diode 45 whose cathode is connected to the gate transistor 37;
  a second branch connected between the ground and the midpoint of the first branch of the second tripler, consisting of a capacitor 41 connected to the anode of a diode 42 whose cathode is connected to the anode of diode 45;
  a diode 43, the anode of which is connected to the midpoint between the capacitor 29 and the capacitor 44, and the cathode of which is connected to the midpoint of the second branch of the second tripler, ie at the anode of the diode 42;
  a capacitor 46 connected between the cathode of the diode 45 and the ground.

The circuit of FIG. 8 is only a particular example of a possible scheme for switching the antennas. Other realizations could be considered, such as for example a gravitational switch which would make it possible to physically disconnect the antenna whose position would be the least optimal, see also a device based on fuses making it possible to physically burn the connections between the RFID chip and the one of the antennas that would not allow optimal reception with an RFID transmitter.

The electronic switching circuit 20 makes it possible, as we have seen, to couple two antennas to a single RFID chip.

Figure 8F:
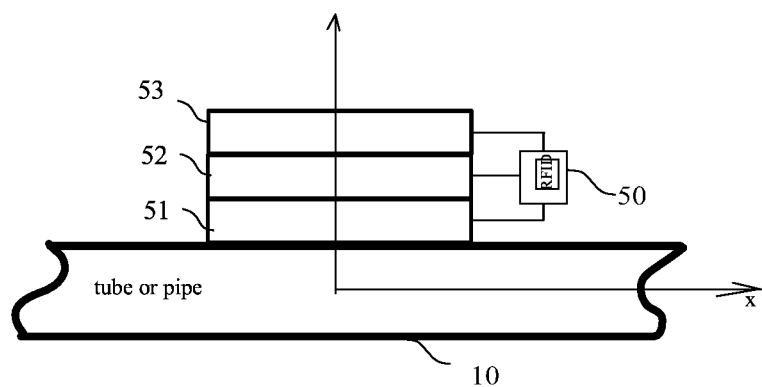
FIG. 8*f* illustrates a particularly preferred embodiment, in which a single RFID chip is associated with three associated rectangular antennas.

The inventors have however discovered that the most promising results can be obtained by associating, in this embodiment, not two but three antennas with a single RFID chip according to a very specific arrangement, and illustrated in FIG. 8f which will now describe.

Referring to FIG. 8, we see three antennas, respectively 51, 52 and 53, of substantially rectangular shape along the axes x and y which are contiguous at their length (axis x), preferably equal to 40 cm. The width of the antenna is calculated to correspond to a third of the circumference of the tube so that the set of three antennas forms a sleeve which encloses the tube or the pipe. We then observe an offset close to 120 degrees for the antennas, which makes it possible to cover, with these three elementary antennas, the complete solid angle.

Each of the three antennas 51-53 is coupled to an electronic switching circuit 50, which may or may not be similar to that already described above, and the switching circuit 50 is configured to couple the RFID chip to that among the first, second and third antenna which has the highest voltage.

The switching circuit thus ensures the coupling of this specific antenna to the RFID chip while decoupling the other two antennas having the lowest voltages.

In this way, it is possible to produce, according to this first embodiment, an omnidirectional RFID transponder capable of operating to a great depth.

We will now describe another particularly effective embodiment.

3) RFID Macro-Label Composed of Three RFID Chips

We now describe a second embodiment, which turns out to be the embodiment particularly preferred by the inventors, and which makes it possible to avoid the use of the electronic switching circuit.

In general, the inventors have discovered the possibility of obtaining omnidirectional detection, insensitive to the orientation of the pipe in the trench, provided that a specific RFID chip associated with each of the antennas is provided and that a logical processing of the communication likely to occur between the RFID chips and the transmitter . . . .

Such a transponder will be composed of:
- a first RFID chip associated with a first antenna, which provides a surface covering a first part of the outer envelope of the polymer pipeline;
- a second RFID chip associated with a second antenna, which has a surface covering a second part of the outer surface of the polymer pipeline, the second part being distinct from said first part.

To allow the transponder to operate, provision is also made to insert in each of the RFID chips logical information making it possible to communicate the grouping of the two RFID chips produced within the pipeline. In a particular embodiment, the first RFID chip is configured to include a field allowing the storage of an identification element or serial number, Unique Identifier (UID), of the second RFID chip. Conversely, the second RFID chip is configured to include a field allowing the storage of an identification element, UID, of the first RFID chip.

The RFID chips are then configured to transmit this information to a surface detector or reader as soon as they are activated. Thus the surface detector becomes informed of the logical grouping produced between the two RFID chips, and incidentally can determine that the two RFID chips belong to the same buried polymer pipe.

In a particularly effective embodiment, inspired by the arrangement of FIG. 8f already encountered previously, the inventors obtained the best results by combining three contiguous antennas, offset by 120 degrees, within a sleeve which encloses the tube or the pipeline.

Figure 9A:
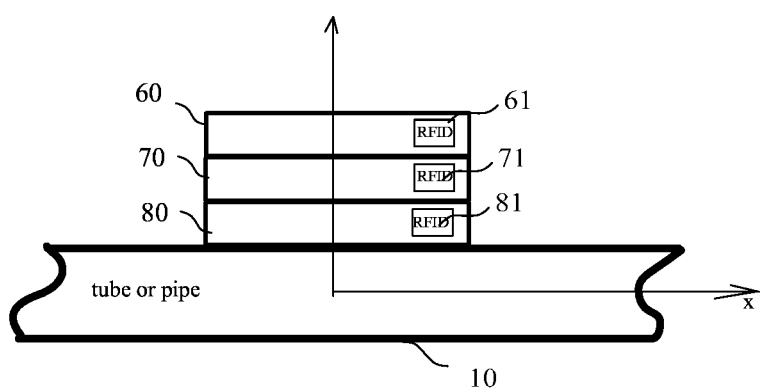
FIG. 9*a* illustrates a second embodiment in which a logical grouping of two RFID tags is carried out.

Preferably, as illustrated in FIG. 9a, the transponder of the second embodiment will have three antennas and three RFID chips as illustrated in FIG. 9a.

We can see that the transponder includes:
- a first RFID chip 61 associated with a first antenna 60, which provides a surface covering a first part of the outer envelope of the polymer pipeline;
- a second RFID chip 71 associated with a second antenna 70, which has a surface covering a second part of the outer surface of the polymer pipeline, the second part being distinct from said first part; and
- a third RFID chip 81 associated with a third antenna 80, which has a surface covering a third part of the exterior surface of said polymer pipe.

As in the configuration of FIG. 8f, the three antennas 60, 70 and 80 are of substantially rectangular shape, and contiguous at their length. Once wrapped around the pipe, they form a sleeve that encloses the latter and each antenna is offset by an angle of 120 degrees from the previous one. To ensure logical processing during RFID detection by a surface detector, we plan to configure:
- the first RFID chip 61 to store the identification elements or serial number, Unique Identifier (UID), of the second and third RFID chips;
- the second RFID chip 71 to store the identification elements, UID, of the first and third RFID chips;
- the third RFID chip 81 to store the identification elements, UID of the first and second RFID chips.

So when a chip is activated by the detector, it will be able to send it the UID number of the two other RFID chips associated with it within the same RFID tag. From this moment, the detector knows that these three UID identification numbers are associated within the same group. The software executed within the surface detector can then, whatever one of the three chips activated during detection/localization, treat it correctly as if it saw only one RFID transponder located on the pipeline.

Figure 9B:
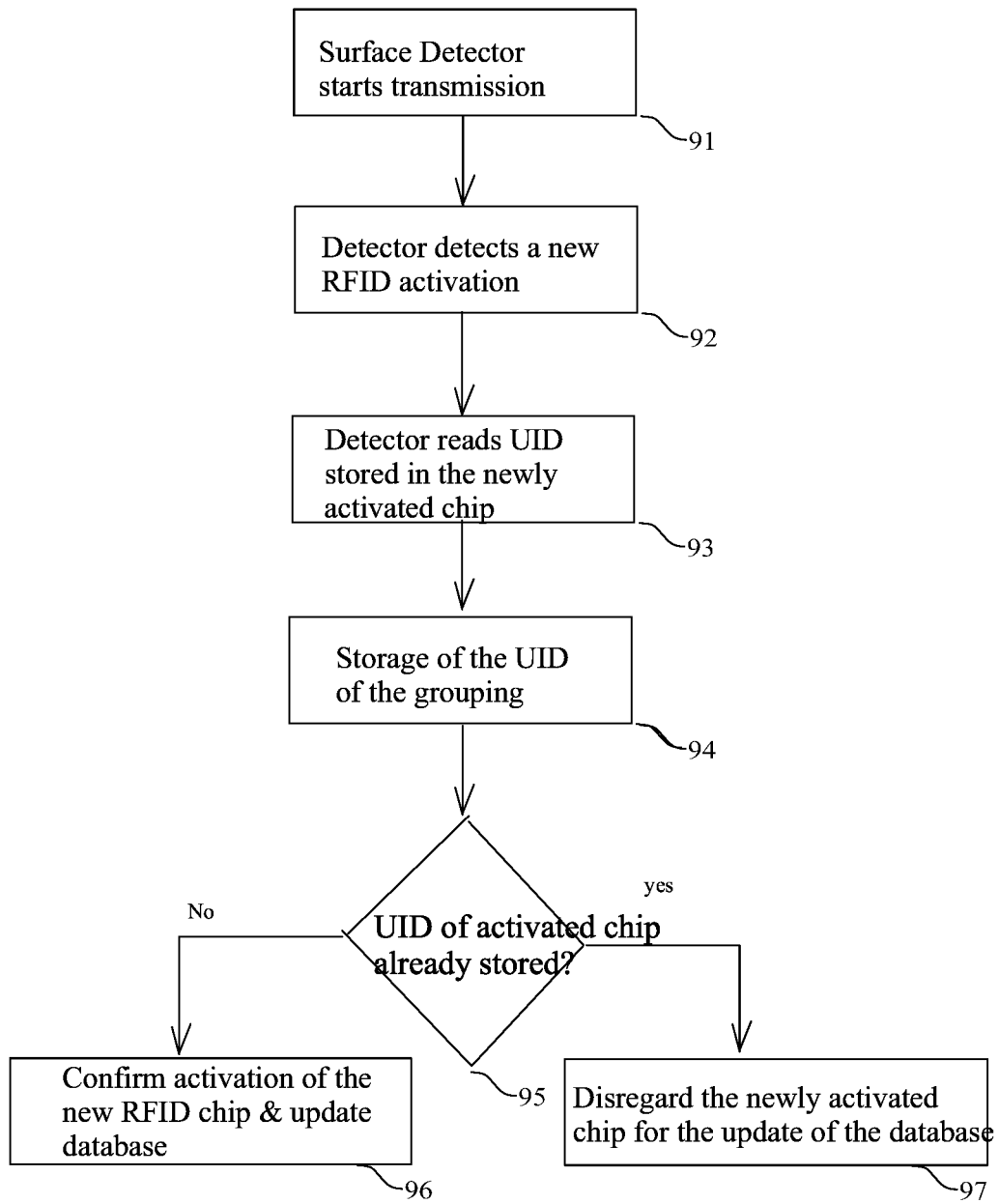
FIG. 9*b* illustrates an embodiment of a method of communication between a transponder according to the second embodiment and a surface reader.
Figure 10:
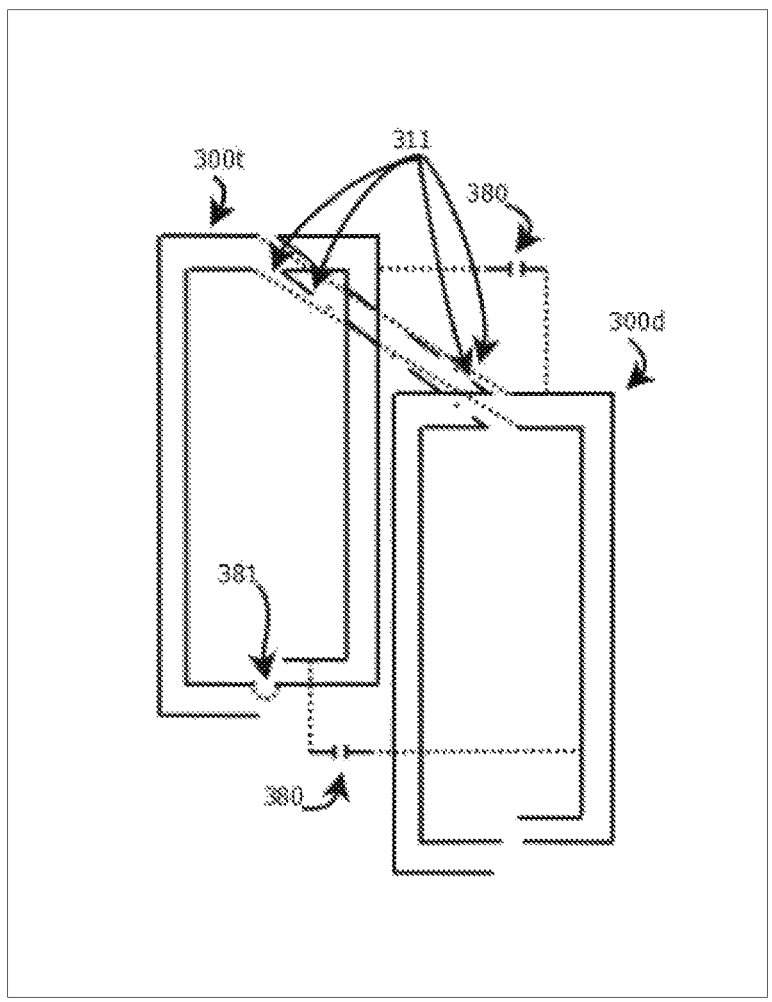
FIG. 10 illustrates the block diagram of the solution recommended by the above-mentioned patent application WO2011157941

We now describe, in relation to FIG. 9b, the activation process of the surface detector communicating with RFID tags and transponders.

In a step 91, the surface detector starts an RFID transmission or an attempt of transmission by generating an electromagnetic signal intended for the recognition of an RFID tag buried in the ground.

In a step 92, the method detects a potential activation of one of the three RFID chips belonging to the same logical grouping, for example the chip 61. In general, only the RFID chip 61-71-81 will be activated, which will be associated with a most favorably positioned antenna and which will receive sufficient energy from the surface detector. Once activated, the communication operates according to the standard provided for in the RFID standard and which, for the sake of brevity, it is not necessary to reproduce here.

It will simply be noted that, in a step 93, the surface detector receives communication of the information stored in the newly activated chip, in particular by reading the content of the specific field of the RFID chip intended for the storage of the UIDs of potentially associated chips within the same transponder. Thus, the surface detector receives communication by the RFID chip 61 from the two other identifiers of the chips 71 and 81 which form the same logical unit within the transponder fixed on the pipe 10.

In a step 94, the surface detector then proceeds to store the UID identifiers of the two other sister chips of the newly activated RFID chip 61. This storage takes place in a local database stored in the memory of the surface detector.

Then, in a step 95, the detector compares the UID number of the newly activated chip with the numbers already stored in memory in the aforementioned database.

If the UID number does not appear to be already stored, then the process goes to a step 96 where the activation of the RFID chip 61 is confirmed as allowing an update of the database of discovered pipes.

On the contrary, if the test in step 95 proves to be positive, that is to say that the UID number of the activated chip corresponds to a number already previously stored in memory, then the detector does not take into consideration the UID of the newly activated chip to update the database of discovered pipelines, because it belongs to a logical grouping already detected beforehand and therefore to an already identified transponder.

The process described thus makes it possible, as can be seen, to avoid the detector concluding that there are two separate pipes, respectively associated with two separate RFID chips. Such logical processing thus considerably simplifies the solution and the development of an omnidirectional RFID transponder, since it is no longer necessary to consider the design and manufacture of an electronic switching circuit.

The invention claimed is:

1. A transponder for a wireless communication and contactless identification system, of the RFID type, intended to be affixed to a buried polymer pipe (10), comprising:
   a first RFID chip (61) associated with a first antenna (60) said first antenna having a surface covering a first part of the outer surface of said polymer line;
   a second RFID chip (71) associated with a second antenna (70), said second antenna having a surface covering a second part of the external surface of said polymer pipe, said second part being distinct from said first part;
   wherein said first RFID chip (61) includes a storage configured to store a field allowing the storage of an identification element, UID, of said second RFID chip (71);
   wherein said second RFID chip (71) includes a storage configured to store a field allowing the storage of an identification element, UID, of said first RFID chip (61);
   wherein the identification element of the first RFID chip (61) and the identification element of the second RFID chip (71) are used to enable a surface detector to determine that the two RFID chips belong to a same buried polymer pipe.

2. The transponder according to claim 1 further comprising:
   a third RFID chip (81) associated with a third antenna (80), said third antenna having a surface covering a third part of the external surface of said polymer pipe, the coverage area of each of said first, second and third antennas corresponding to an angle of 120 degrees,
   wherein said first RFID chip (61) is configured to store the identification elements, UID, of the second (71) and third (81) RFID chips;
   wherein said second RFID chip (71) is configured to store the identification elements, UID, of said first (61) and third (81) RFID chips;
   wherein said third RFID chip (81) is configured to store the identification elements, UID, of said first (61) and second (71) RFID chips; wherein the identification elements of the first, second and third RFID chip (61, 71, 81) are used to allow a surface detector to determine that said first, second and third RFID chip belong to the same buried polymer pipeline.

3. The transponder according to claim 1, in which each antenna associated with an RFID chip comprises:
   a set of antenna segments made up of electrical conductors constituting at least a first and a second antenna element (203-1, 203-2),
   a printed circuit comprising an RFID chip and at least one tuning capacitor (202*x*) as well as a connector (281) allowing the electrical connection of said antenna segments;
   characterized in that said antenna segments are arranged close to one another, at a distance of less than 3 mm and preferably less than 1 mm, so as to allow the generation of coupling capacitances capable of widening the band of tolerance on the RFID resonance frequency.

4. The transponder according to claim 3 characterized in that the antenna segments are arranged in the same plane, concentrically, and electrically connected to said connector (281), in which two immediately adjacent antenna segments are arranged at a distance less than 3 mm, and preferably 1 mm allowing the generation of coupling capacities capable of widening the tolerance band on the RFID resonance frequency.

5. The transponder according to claim 3 characterized in that the antenna segments have planes superposed on each other, in which two immediately adjacent antenna segments are located at a distance of less than 3 mm and preferably less than 1 mm allowing the generation of coupling capacities likely to widen the tolerance band on the RFID resonance frequency.

6. The transponder according to claim 3 characterized in that the antenna segments are arranged between them to form a twist (282) allowing the generation of coupling capacities capable of widening the tolerance band on the RFID resonance frequency.

7. The transponder according to claim 6, characterized in that said first, second and third antenna segments (801, 802, 803) are integrated within a first three-conductor electric cable and in that said fourth, fifth and sixth antenna segments (804, 805, 806) are integrated within a second three-conductor electric cable.

8. The transponder according to claim 3, characterized in that the said antenna segments are grouped by two or by three within the same conductive cable with two or three wires, with the aim of showing a linear capacitance between each of the segments of antenna with a value between 50 and 75 pF/m.

9. The transponder according to claim 1, characterized in that each of said first, second and third RFID chip is arranged on a printed circuit comprising a connector (281) allowing the connection of three antenna segments (701, 702, 703), said connector (281) comprising:
   a first (284-1), a second (284-2) and a third input electrode (284-3) allowing the connection of a first end of a first (701), a second (702) and a third (703) antenna segment, respectively;
   a fourth (285-1), a fifth (285-2) and a sixth (285-3) output electrodes allowing the connection of a second end of said first (701), said second (702) and said third (703) antenna segment;
   characterized in that said integrated circuit comprises:
      a first circuit (286-3) allowing the connection of the first input electrode (284-1) to the third output electrode (285-3) via an RFID chip;
      a second circuit (286-1) allowing the connection of the second input electrode (284-2) to the first output electrode (285-1);
      a third circuit (286-2) allowing the connection of the third input electrode (284-3) to the second output electrode (285-2) via a capacitor (202*x*).

10. The transponder according to claim 9, characterized in that said first, second and third antenna segments (701, 702, 703) are integrated within the same three-conductor electric cable making it possible to generate a capacity distributed between said antenna segments.

11. The transponder according to claim 1, characterized in that it comprises means for communicating the identity, the characteristics of manufacture of the tube, and the location of the tube, and in that it is intended for identification of a fluid distribution pipe, such as a drinking water or gas pipe, electric cable protection or optical fiber cable.

12. The transponder according to claim 1, characterized in that it includes a protective polymer layer.

13. A method of detecting a transponder as defined in claim 1, comprising the steps:

generation (91) by a surface detector of an electromagnetic signal configured to allow the detection of an RFID tag;

activation (92) of an RFID chip associated with an antenna receiving sufficient energy;

reading (93) by said surface detector of the information stored in the newly activated chip, and in particular of the content of the specific field relating to the logical grouping of the RFID chips within the same transponder;

storage (94) within said detector of the UID identifiers of the two other sister chips of the newly activated RFID chip;

comparing (95) the UID number of the newly activated chip with the numbers already stored in memory;

confirming the activation (96) only if the UID number of the newly activated chip is not already stored in the surface detector's memory, and update the database of detected pipes.

\* \* \* \* \*